United States Patent [19]

Wong

[11] Patent Number: 4,959,909

[45] Date of Patent: Oct. 2, 1990

[54] CONTOUR TRACER

[76] Inventor: Man T. Wong, 370 Dixon Road, Apt 1008, Weston, Ontario, Canada, M9R 1T2

[21] Appl. No.: 248,612

[22] Filed: Sep. 26, 1988

[51] Int. Cl.⁵ .............................................. G01B 5/20
[52] U.S. Cl. .................................................. 33/501.1
[58] Field of Search .............. 33/175, 176, 177, 561.1, 33/561.2, 561.3; 446/108-126; 160/DIG. 8, 229.1; 256/19, 73

[56] References Cited

U.S. PATENT DOCUMENTS

| | | | |
|---|---|---|---|
| 422,707 | 3/1890 | Bockel et al. | 160/229.1 |
| 2,222,127 | 11/1940 | Turner | 33/175 |
| 2,671,273 | 3/1954 | Barnes | 33/175 |
| 4,807,369 | 2/1989 | Chin | 33/175 |

FOREIGN PATENT DOCUMENTS 559647 6/1923 France .............................. 160/229.1

*Primary Examiner*—Harry N. Haroian
*Attorney, Agent, or Firm*—David W. Wong

[57] ABSTRACT

A contour tracer particularly useful for floor tiles installation is shown. It consists of a plurality of elongated section members having an identical shape and construction and slidably coupled together. Each section member consists of a single integrally formed element comprises a cylindrical portion and a sheath portion joined together by a web portion. The sheath portion has a C-shaped cross section with an opened slot formed on the side directly opposite to the cylindrical portion. The section members are coupled together by engaging the sheath portion of one section member to the cylindrical portion of the next section member. The tracer can be used on uneven surfaces and in space restrictive areas.

3 Claims, 2 Drawing Sheets

CONTOUR TRACER

BACKGROUND OF THE INVENTION

The present invention relates to a contour tracer and particularly to a tracer for use in installing floor tiles against a non-linear profile.

In floor tiles installation, it has been a common problem in shaping the tiles to engage properly with a non-linear profile or edge such as the outline or contour of a pipe, a toilet, a cabinet or even around door jams. Heretofore, one method to resolve such problem, was usually to press a piece of paper against such profile and the shape or outline of the object was marked or traced out on the paper. The outline on the paper was subsequently cut out for use as a template for tracing out the required outline on the tiles to be used. Such method was time consuming to carry out and inaccuracy would be introduced in marking the outline onto the paper and cutting it out as well as in transferring it to the tiles. Furthermore, it is difficult to find the suitable paper for use which would have the desirable texture and flexibility to be pressed against the object for marking and tracing its outline or profile without tearing and/or mutilating the paper. Moreover, the paper must have the strength and rigidity to be used as a template without losing the traced and cut outline.

Another attempt to transfer the required outline to the tiles was by using a contour gauge. Such gauge consists of a plurality of thin wires bound together permanently by one or two brackets disposed transverse to the wires. The wires may be forced to slide relative to one another so that the ends of the wires in combination could be made to form an outline. Such gauge could be used to trace the outline of an object by placing it with one end abutting the side of the object and tapping the other end of the gauge with fingers or a mallet until the wires are forced to displace relative to one another so that their ends in combination conform to the outline of the object. The outline could thus be transferred to the tiles to be used. Such gauge is more convenient to use than tracing the outline with paper; however, since the width of the gauge is fixed by the number of wires bound permanently by the brackets, in some instances the width of the gauge may be too wide so that it cannot be positioned in the restricted space between the object to be traced and the adjacent wall or another object, thus rendering the gauge not useable. Also, due to the rigidity of the brackets such gauge cannot be used on an uneven floor. Yet, on the other hand, due to that such gauge is made of pliable wires, its size is constructionally restricted to only about 6 inches wide by 3 inches long, as longer wires would tend to distort undesirably when being tapped with an axial force during use in tracing a contour. Such a small size gauge does not lend itself to the convenient use in floor tile installation. The reason is that common floor tiles are 12 inches square in size, so that at least two tracings of the 6 inches wide gauge are required to mark and transfer any contour to the 12 inches wide tile. Furthermore, such gauge does not provide a measure for transferring the exact position of the contour in the longitudinal direction transverse to the contour, since its length is considerably less than that of the tile. This problem cannot be resolved by increasing the length of the wires in the gauge to 12 inches long, because, as discussed above, due to the pliancy of the longer wires they are diffult to displace relative to one another without distortion or becoming bent.

SUMMARY OF THE INVENTION

It is a principal object of the present invention to provide a contour tracer which can be easily used to trace and transfer a non-linear contour.

It is another object of the present invention to provide a contour tracer which can be made in any selected length for easy application in floor tile installation.

It is yet another object of the present invention to provide a contour tracer with a variable width such that it can be used in a space restricted area.

A further object of the present invention is to provide a contour tracer which can be bent or folded for use on uneven surfaces.

Another object of the present invention is to provide a contour tracer having a simple structure and is easy to produce with known mass production methods.

Yet another object of the present invention is to provide a contour tracer having component parts which are easily removable for cleaning and replacement.

Still another object of the present invention is to provide a contour tracer having components with a simple shape which is conducive to extrusion or injection moulding process in their manufacturing.

In general, these and other objects of the invention that will appear as the description proceeds are achieved in the contour tracer of this invention, which is characterized by having a plurality of elongated section members slidably coupled together. Each section member consists of a single integrally formed element comprises a generally cylindrical member, a web means formed along a longitudinal lateral side of the cylindrical member. An elongated sheath member is formed along the lateral side of the web means opposite to the cylindrical member. The sheath member and the cylindrical member are mutually parallel to each other. The sheath member has a substantially C-shaped cross section and has an opened slot formed along its side directly opposite to the web means and extending throughout the entire length of the sheath member. The inside diameter of the sheath member is equal to the diameter of the cylindrical member and at least one end of the sheath member may be preferably recessed from the end of the cylindrical member.

BRIEF DESCRIPTION OF THE DRAWINGS

These and other objects of this invention together with its advantages will be more apparent from the following description and drawings which illustrate a specific embodiment by way of example and in which.

DESCRIPTION OF THE SPECIFIC EMBODIMENT

Figure 3:
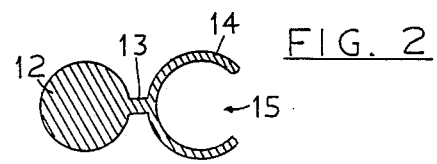
FIG. 3 is a top elevation view of the contour tracer according to the present invention having a plurality of elongated section members coupled together.
Figure 1:
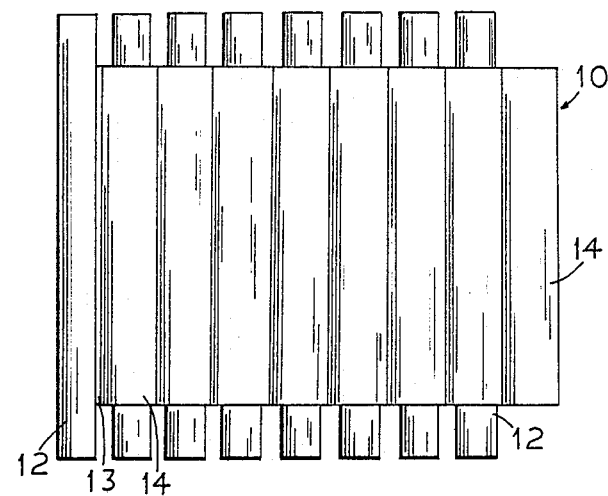
FIG. 1 is a front perspective elevation view showing two elongated section members in the contour tracer according to the present invention.
Figure 2:
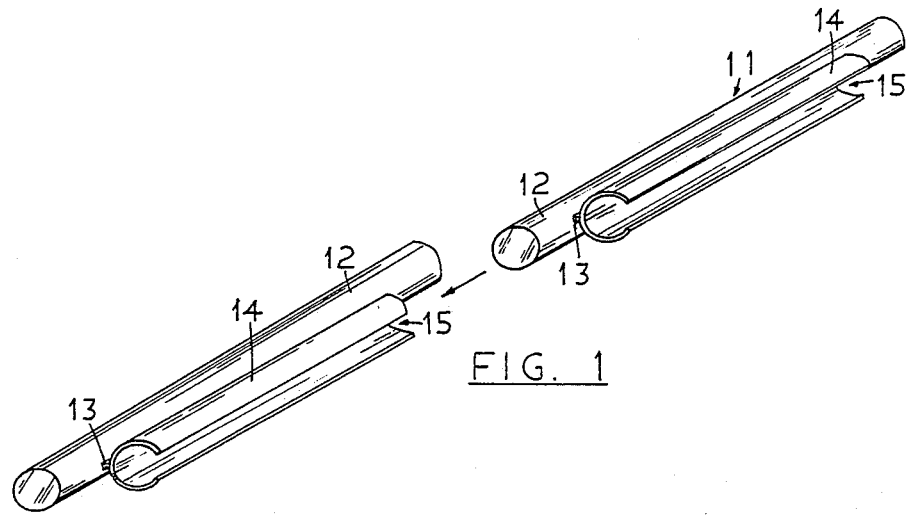
FIG. 2 is a cross section elevation view along the line II—II in FIG. 1.

Referring now to the drawings in which like reference numerals designate corresponding parts in the several views. the contour tracer 10 comprises a plurality of rigid elongated section members 11 slidably mounted together. Each elongated section member 11 consists of a cylindrical Portion 12 having a generally circular cross section; an elongated web or rib 13 formed on the surface of the cylindrical portion 12. The web 13 is parallel to the longitudinal axis of the cylindrical portion 12 and having a length shorter than the cylindrical portion 12. Preferably both ends of the web 13 are recessed from the ends of the cylindrical portion 12 as best shown in FIG. 1. The advantage of such recessed ends will become more apparent in the following description. An elongated sheath portion 14 is formed on the web 13. The sheath portion 14 has an inside diameter equal to the diameter of the cylindrical portion 12 and is mutually parallel to the latter. An opened slot 15 is formed along the lateral side of the sheath portion 14 located directly opposite to the web 13. The opened slot 15 extends throughout the entire longitudinal length of the sheath portion 14 and its width is shorter than the inside diameter of the latter. At least one end of the sheath portion 14 may be recessed from the end of the cylindrical portion 12; and preferably as shown in FIGS. 1 and 3 both ends of the sheath portion 14 are recessed from the ends of the cylindrical portion 12.

As best shown in FIG. 1 two elongated section members 11 may be slidably mounted together by inserting the cylindrical portion 12 of one section member into the sheath portion 14 of the other. Since the inside diameter of the sheath portion 14 is equal to the diameter of the cylinddrical portion 12, the two section members are snug-fitted together yet are slidable and turnable relative to each other. A selected number of section members 11 may thus be mounted together as shown in FIG. 3. Since the width of the opened slot 15 is narrower than the inside diameter of the sheath portion 14 and the diameter of the cylindrical portion 12, the cylindrical portion 12 of one section member cannot disengage from the sheath portion 14 of the other section member through the opened slot. The distance of rotation of the section members with respect of each other is limited by the web 13 of the first section member abutting the two sides of the opened slot 15.

Figure 4:
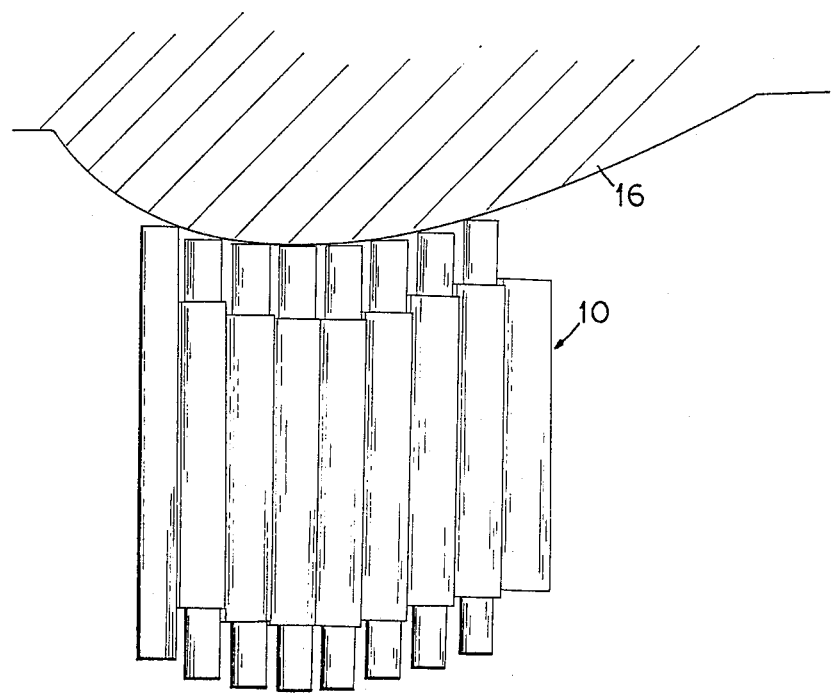
FIG. 4 is a perspective top elevation view showing the operation of the contour tracer according to the present invention.
Figure 5:
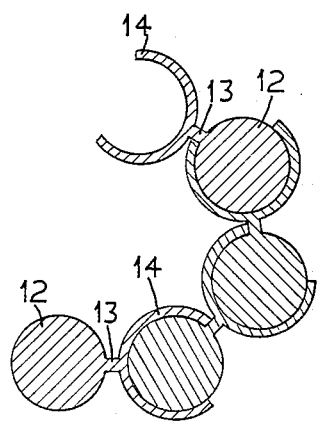
FIG. 5 is an end elevation view of the contour tracer in the folded configuration.

As shown in FIG. 4, the contour tracer 10 having a selected number of section members 11 coupled together may be used to trace the outline of an object 16 by placing it on the floor with the ends of the section members abutting the side of the object 16. The section members 11 are then moved by sliding with respect to one another until the ends in combination conform to the contour of the object 16. The tracer may thus subsequently be laid on the tiles to use for marking thereon the required outline. The tiles may then be cut along the marked outline for installation.

Since the construction of both ends of the tracer are identical, either end may be used for contour tracing. Also, it can be appreciated that any selected section member may be conveniently removed from the assembly for cleaning or replacement.

Due to the simple shape of the section member of the present invention it may be made with a continuous extrusion method and then cut into the identical sections of an equal length or alternatively by the injection moulding process. Aluminium or alloy or suitable plastic material may be used in such manufacturing processes.

Since the section members are rigid, they are suitable to be made in any selected length to facilitate the utilization of the tracer; typically, the section members 11 may be made in 12 inches length to construct a tracer of 12 inches square identical to the dimensions of a common floor tile, so that both the shape and position of the contour can be duplicated and transferred quickly and easily by laying the tracer on the tile directly. Other typical selected sizes are 6 inches by 12 inches and 4 inches by 12 inches for use in various space restrictive areas.

While the invention has been particularly shown and described with reference to a preferred embodiment thereof, it will be understood by those skilled in the art that various changes in form and detail may be made therein without departing from the spirit and scope of the invention. For example, as shown and described in the above preferred embodiments, at least one end of the web 13 and the sheath portion 14 may be recessed from the adjacent end of the cylindrical portion 12. However, functionally, such recesses are not essential to carry out the principle of the present inventio.

What is claimed as the invention is:

1. A contour tracer substantially rectangular in shape and having a plurality of elongated section members slidably coupled together wherein each section member having a cross sectional OC configuration comprising,
   an elongated solid cylindrical rod member having a circular diameter,
   an elongated hollow cylindrical sheath member disposed in a parallel manner in a close proximity from said rod member, said sheath member having a substantially C-shaped cross section and having a thin side wall of a selected thickness,
   an opened slot formed along a lateral side of said sheath member and extending throughout the entire longitudinal length of said sheath member,
   said sheath member having an inside diameter equal to said circular diameter of said rod member, and said slot having a width less than said inside diameter of said sheath member,
   said sheath member and said rod member being joined together by a web means disposed along a longitudinal side of said sheath member and located diametrically opposite to said slot, said web means having a cross sectional length extending from said sheath member to said rod member, and said cross sectional length being substantially equal to the thickness of said side wall of said sheath member.

2. A contour tracer according to claim 1 wherein said sheath member and said rod member are equal in length.

3. A contour tracer according to claim 1 wherein said sheath member is shorter in length than said rod member.

* * * * *